United States Patent
Current

[11] Patent Number: 5,305,978
[45] Date of Patent: Apr. 26, 1994

[54] ARCUATE COMPRESSION CLAMP

[75] Inventor: Wayne Current, Holmdel, N.J.

[73] Assignee: International Visual Corporation, Port Washington, N.Y.

[21] Appl. No.: 68,580

[22] Filed: May 26, 1993

Related U.S. Application Data

[63] Continuation of Ser. No. 806,886, Dec. 12, 1991, abandoned.

[51] Int. Cl.⁵ .................. B65D 77/00; A44B 21/00
[52] U.S. Cl. .................. 248/230; 248/74.3; 248/231.5
[58] Field of Search .................. 248/230, 231.6, 218.4, 248/74.4, 314, 229, 72, 231.5, 316.5, 74.2, 62, 74.3; 40/607; 24/484, 16 PB, 16 R

[56] References Cited

U.S. PATENT DOCUMENTS

| | | |
|---|---|---|
| D. 286,371 | 10/1986 | Shuman . |
| 1,217,838 | 2/1917 | Schmidt .................. 248/229 X |
| 1,871,240 | 8/1932 | Scheller .................. 248/230 X |
| 2,113,180 | 4/1938 | Klein .................. 248/230 |
| 2,496,478 | 2/1950 | Kinnebrew .................. 248/230 |
| 2,616,196 | 11/1952 | Sandahl, Jr. et al. .................. 248/230 X |
| 3,030,681 | 4/1962 | Phillips .................. 248/230 X |
| 3,102,352 | 9/1963 | White . |
| 3,429,985 | 2/1969 | Czigler .................. 248/74.3 X |
| 3,848,838 | 11/1974 | Thomas .................. 248/231.6 X |
| 3,854,685 | 12/1974 | Parduhn .................. 40/607 X |
| 3,913,187 | 10/1975 | Okuda .................. 248/74.3 X |
| 4,338,875 | 7/1982 | Lisowski .................. 248/230 X |
| 4,677,780 | 7/1987 | Shuman . |
| 4,880,195 | 11/1989 | Lepley .................. 40/607 X |
| 4,881,301 | 11/1989 | Sweeney et al. .................. 24/16 PB X |
| 5,088,672 | 2/1992 | Neuendorf et al. .................. 248/230 |

FOREIGN PATENT DOCUMENTS

| | | |
|---|---|---|
| 3034546 | 4/1981 | Fed. Rep. of Germany .................. 248/74.3 |
| 3439418 | 5/1986 | Fed. Rep. of Germany .................. 248/74.2 |
| 2500571 | 8/1982 | France .................. 248/62 |

Primary Examiner—Karen J. Chotkowski
Attorney, Agent, or Firm—Darby & Darby

[57] ABSTRACT

A clamp useful as part of a sign holder which displays identifying characteristics of merchandize on a display rack support rod of circular cross-section. The clamp has an upper housing and a lower housing hingably connected together. The free ends of the housings engage each other as they are overlapped one over the other. When the upper and lower housings overlap, teeth on each are resiliently urged toward each other to engage each other to releasably lock the housings into any desired one of a plurality of relative rod encircling positions. Friction pads are urged by the upper and lower housings against the rod. The pads compress in response to increasing the amount of overlap by relative movement of the upper and lower housings. The clamp completely encircles the rod.

11 Claims, 3 Drawing Sheets

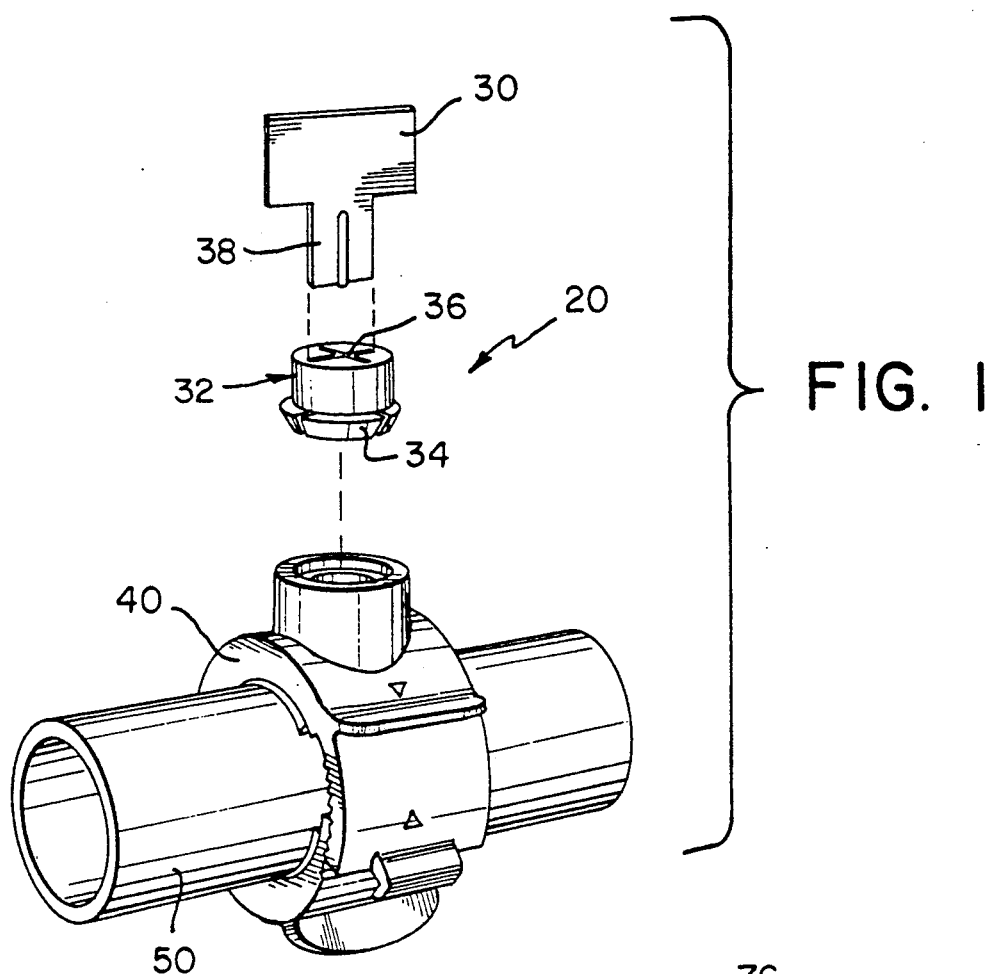
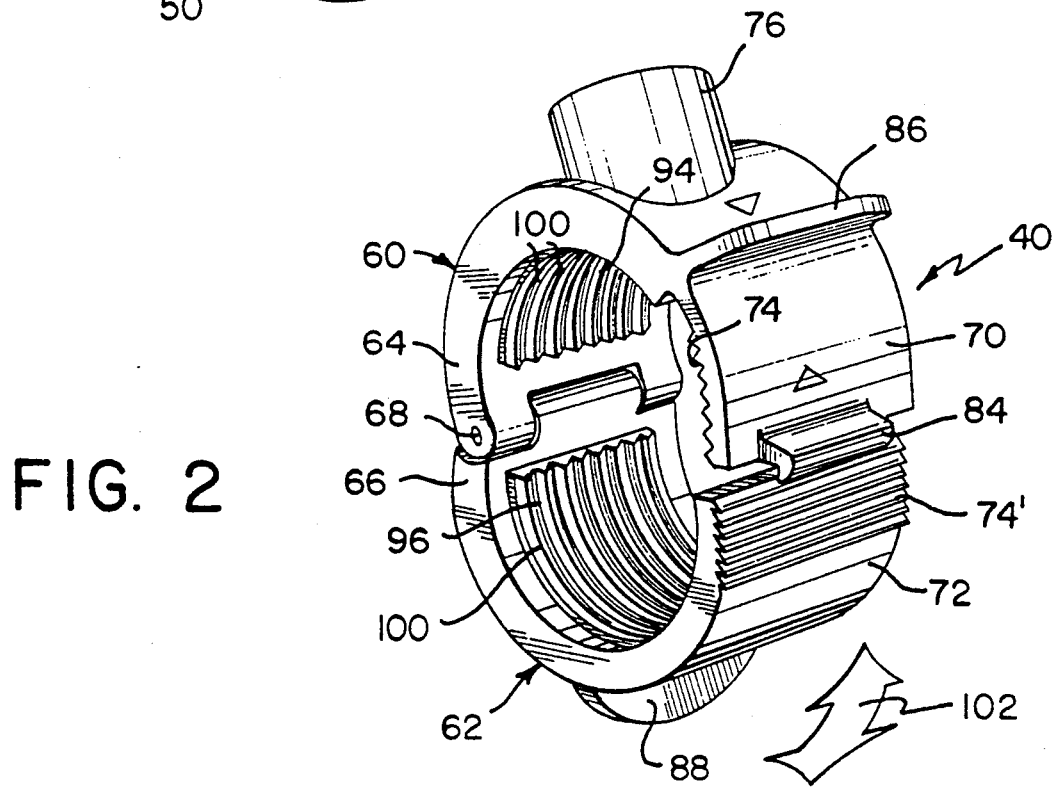

ARCUATE COMPRESSION CLAMP

This is a continuation of application Ser. No. 07/806,886, filed Dec. 12, 1991, and now abandoned.

FIELD OF THE INVENTION

The invention relates to an arcuate compression clamp for a sign holder, which can be readily shifted to any desired position on a display rack or similar support which displays merchandise such as, for instance, clothing. The clamp resists inadvertent displacement out of any such position in which it is placed.

BACKGROUND OF THE INVENTION

U.S. Pat. No. 4,687,788, whose contents are incorporated herein by reference, discloses a sign holder for use on a rod of rectangular cross-section that serves as a horizontal support of a display rack for merchandise. Such a sign holder is positioned to separate two adjacent groups of merchandise when magnetically clamped onto the rod.

The sign holder of this patent has a magnetic clamp which is configured to have an inverted L-shape defined by a horizontal portion and a vertical portion. The horizontal portion rests on the top flat surface of the rod and has an opening for receiving a sign post. The vertical portion has magnets for magnetically attracting the side flat surface of the rod.

While this L-shaped magnetic clamp works well for clamping onto a rod with a rectangular cross-section, it would be desirable to provide a sign holder that has a clamp which is better suited for use on a rod which lacks flat surfaces, such as a rod which has a circular cross-section. Such rods are also used as horizontal display rack supports for merchandise, such as clothing. Clamps are known which completely encircle the rod with circular cross-section and whose ends are secured together by a fastening screw.

SUMMARY OF THE INVENTION

The present invention is directed to an arcuate compression clamp useful for clamping a sign holder to a support rod whose periphery is of circular cross-section. With this clamp, the sign holder may be readily shifted from place to place on a rack. It may be loosened, shifted and tightened with use of only one hand and may be used on rods having diameter of varying dimension and even some roundness variation. Nevertheless, the clamp is able to resist inadvertent displacement of the sign holder out of any position in which it may be placed and the clamp is not dependent upon a screw-type or similar fastening device for its securement to the rod.

The clamp includes (a) an upper housing adapted to support the sign, and a lower housing, each of the housings having a pair of opposed ends; (b) means for hingedly connecting the housings at corresponding ends thereof so as to permit the opposite free ends of the housings to move relative to each other in a direction to selectively change or release the support rod extending through a space formed between the housings; (c) engaging means for releasably locking together the free ends of each of the housings at any one of a plurality of relative positions thereof, the engaging means including engaging elements which engage each other when the free ends of the housings overlap each other; and (d) the housings each comprising friction pad means adapted to contact the rod when the engaging elements are in engagement with each other in at least one of said relative positions thereof, the friction pad means being compressible against the rod in response to increasing the amount of the overlap of the free ends of the housings.

The upper and lower housings overlap when the engaging elements are engaged with each other. The friction pad compresses when the upper and lower housings clamp to the support rod. Consequently, each friction pad under compression generates friction forces which resist inadvertent displacement of the clamp. The weight of the sign may be borne entirely by the rod so that the clamp only needs to resist inadvertent displacement and does not need to also support the weight of the sign.

BRIEF DESCRIPTION OF THE DRAWINGS

For a better understanding of the present invention, reference is made to the following description and accompanying drawings while the scope of the invention will be pointed out in the appended claims.

FIG. 1 is an exploded perspective view showing a sign holder with a clamp according to the present invention installed on a cylindrical rod.

FIG. 2 is a perspective view of the clamp of FIG. 1 by itself in the open position.

DESCRIPTION OF THE PREFERRED EMBODIMENTS

Figure 3:
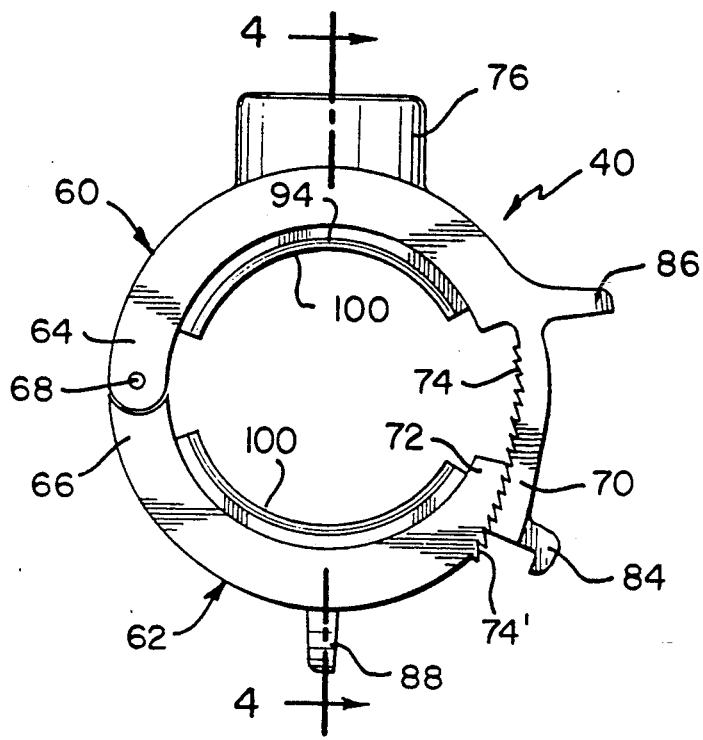
FIG. 3 is an end view of the clamp of FIG. 2 in the closed position.

FIG. 1 shows a sign holder 20 that includes a card holder assembly 30 and a clamp 40. The card holder assembly 30 is identical to the card holder assembly described in U.S. Pat. No. 4,677,780. The clamp 40 is secured to a cylindrical rod 50.

As more clearly seen in FIG. 2, the clamp 40 has an upper housing 60 and a lower housing 62, hingably connected to each other at one of their respective ends 64, 66 by a hinge 68. Their respective other or free ends 70, 72 are free to engage each other by means of complementary engaging teeth 74, 74'. Both the upper and lower housings 60, 62 may be curved to have a generally semicircular cross-section and, preferably, are chrome plated metal or plastic.

Figure 6:
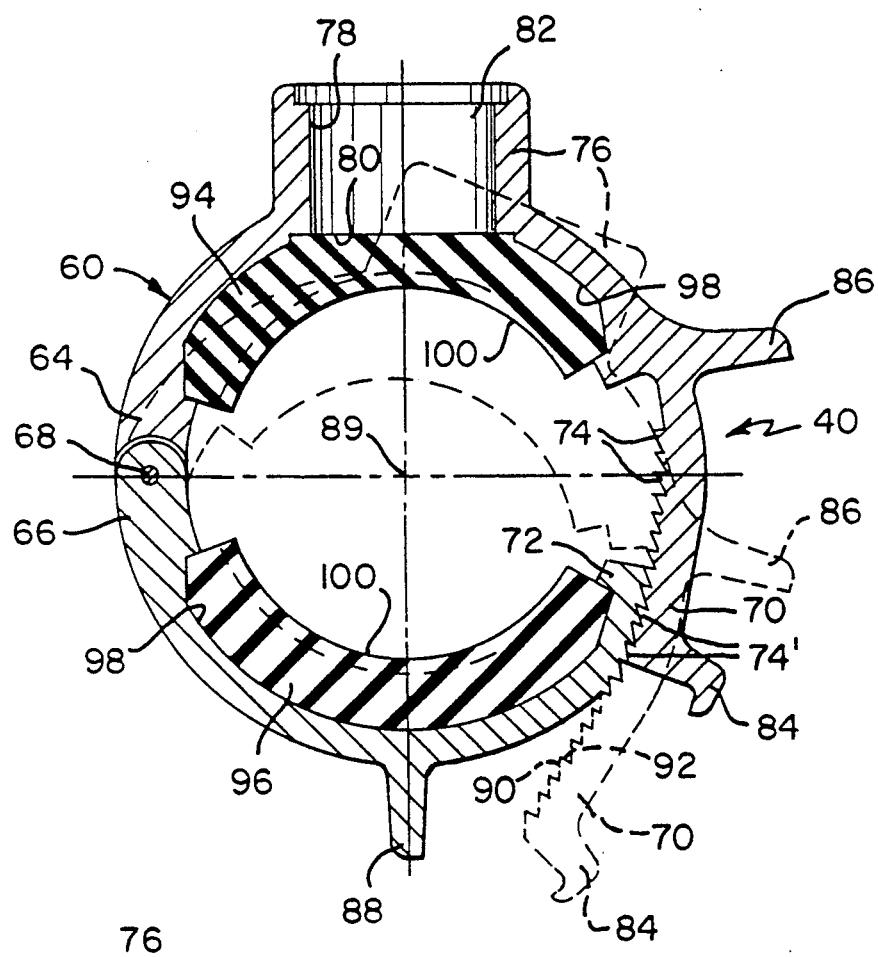
FIG. 6 is a cross-section along lines 6—6 of FIG. 5. Phantom lines show further closure of the clamp when used for smaller diameter rods.
Figure 7:
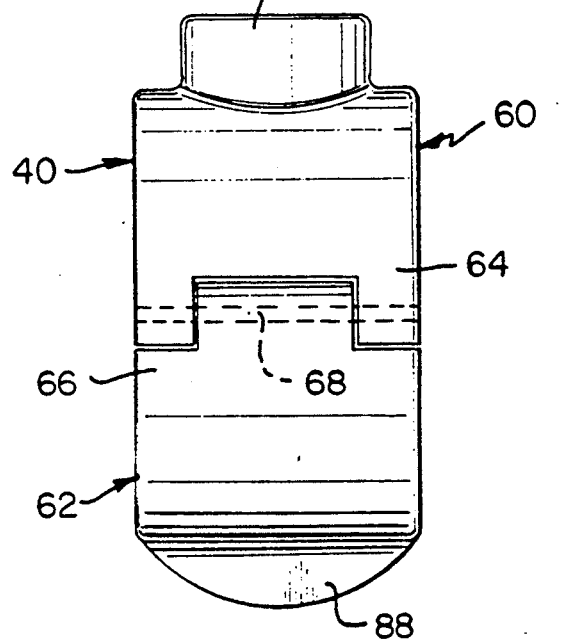
FIG. 7 is a left side view of FIG. 3.

The upper housing 60 also has a central hollow projection 76 that defines an inner channel 78 (see FIG. 6). An adapter 32 (see FIG. 1) may be inserted into the channel 78. The channel 78 has a bottom portion 80 which is wider in diameter than its immediate upper portion 82. The bottom 34 of the adapter protrudes radially outward and tapers downwardly. When inserting the bottom 34 of the adapter into upper portion 82 of the channel 78, the bottom 34 of the adapter 32 compresses. Upon reaching the lower portion 80 of the channel 78, the bottom 34 resiliently snaps outwardly into the bottom portion 80 of the channel 70. The taper facilitates insertion of the adapter 32 into the channel 78. The adapter 32 is preferably made of a resilient material.

After connection of the adapter 32 to the projection 76 is effected, a stem 38 of the sign holder 30 may be inserted into an opening 36 of the adapter 32 to extend into the channel 78 as far as possible. The adapter opening 36 complements the shape of the stem 38 of the sign holder 30 to enable the stem to friction fit into the opening 36. Since the stem 38 may have any one of a number of different shapes, a set of adapters may be made available each having an opening which is compatible with a corresponding one of the stems of a different shape. Thus, the appropriate adapter may be selected for use with the particular stem shape.

FIG. 2 also shows that the upper housing 60 has an "open" handle 84 for opening the clamp and a "close" handle 86 for closing the clamp. The lower housing 62 has a grip handle 88 for gripping and aligning the clamp. The teeth 74' are on the outer facing surface of the free end 72 of the lower housing 62 and the teeth 74 on the inner facing surface of the free end 70 of the upper housing 60. The teeth 74' on the lower housing 62 complement those on the upper housing. The tooth closest to the tip of the free end of the upper housing may engage any desired tooth on the lower housing to thereby enable engagement into any one of a plurality of relative positions.

With reference to FIGS. 2, 3 and 6, the clamp is closed by holding the grip handle 88 stationary and pulling the close handle 86 downward (clockwise) so that the teeth 74, 74' of the lower and upper housings engage. The slant of the teeth 74, 74' (best seen in FIG. 6) inclines in the direction to which the free end 70 is to be pushed about the radial centerpoint 89 to allow relative peripheral sliding of the teeth 74 on the upper housing over the teeth 74' on the lower housing to effect closing. To open, the open handle 84 is pulled radially outward to disengage the teeth 74, 74'. Thereafter, the open handle 84 may be moved upward (counterclockwise) to pivot upper housing 60 about hinge 68 to effect opening the clamp. The resilient springy force of the upper housing normally urges the free end 70 radially inwardly when the teeth 74, 74' are in engagement. The clockwise and counterclockwise directions are represented by arrow 102 in FIG. 2.

Once open, the clamp may be repositioned along the rod 50 as desired and closed again to clamp onto the rod. Once the teeth 74, 74' engage, they effectively lock the upper and lower housings together until manual force is applied to release them as discussed previously, e.g., by pulling the open handle 84 radially outward to disengage the teeth. Each tooth preferably spans a 0.060 inch tangential distance in the circumferential direction of the housing. In other words, the tangential component of the inclined edge 90 of each tooth is 0.06 inches.

In addition to the inclined edge 90, each tooth has a radially extending edge 92. This allows the upper housing 60 to be manually pivoted clockwise, at hinge 68, relative to the lower housing 62, even though the teeth 74, 74' may already be engaged at one of the relative positions. The upper housing may be so pivoted until compression of the pads 94, 96 reaches a point at which further movement is prevented. The radially extending edge 92, on the other hand, blocks counterclockwise movement of the upper housing relative to the lower housing when the teeth are engaged. This is advantageous for preventing inadvertent opening of the clamp, because one must physically pull the open handle 84 to effect disengagement of the teeth 74, 74'.

In order to enhance the clamping effect, resilient, compressible friction pads 94, 96 are provided. Pad 94 is held by the upper housing 60 and pad 96 is held by the lower housing 62 by any suitable fastening techniques. For instance, each may be fitted into a complementary shaped recess 98 (see FIG. 4) on the inner face of the respective upper and lower housing 60, 62. Glue or epoxy adhesives may be employed to effect securement. The pads may be made from silicon rubber, preferably of 40-60 durometer. Each pad preferably has a curvilinear contact surface which conforms to the shape of the outer surface of the rod. Although two pads are preferred, one pad alone may be used.

When the teeth 74, 74' engage, the upper housing may continue to be displaced clockwise (or the lower housing may be displaced counterclockwise) to compress the pads 94, 96. Once compressed, the pads grip the rod 50 to prevent slippage of the clamp on the rod. Such prevention is further enhanced where the pad's contact surface 100, which directly contacts the rod, is ribbed. Each rib preferably extends in a circumferential direction.

Figure 4:
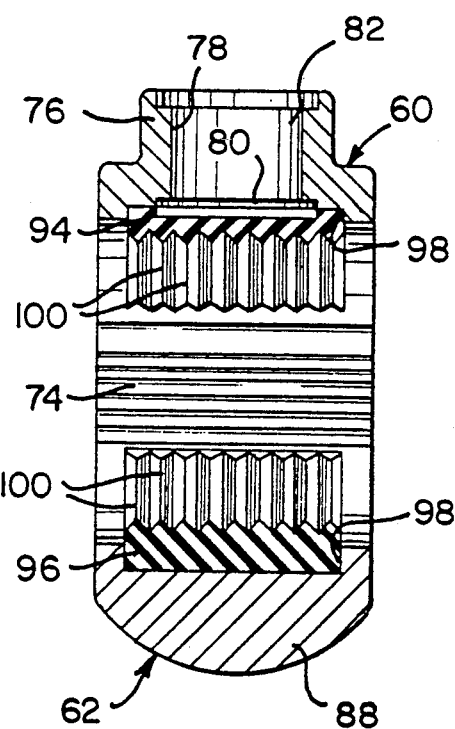
FIG. 4 is a cross-section along lines 4—4 of FIG. 3.
Figure 5:
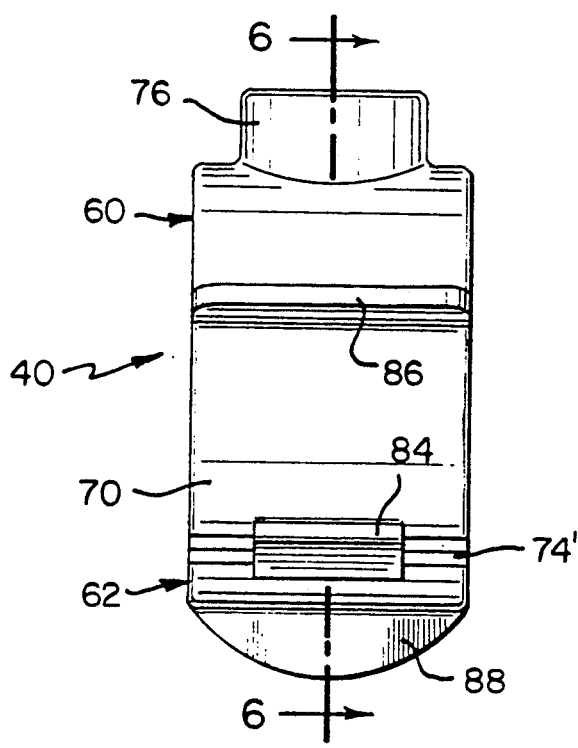
FIG. 5 is a right side view of FIG. 3.

The hollow projection 76 should be kept upright so that when the stem 38 is inserted into the channel 78, the entire weight of the sign is borne by the rod directly via the pad 94, which may further compress under the weight of the sign. If the weight of the sign is insufficient to appreciably further compress the pad 94, then the pad 94 may be cut under the channel 78 to have a smaller thickness than the rest of the pad, as shown in FIG. 4 to allow the stem 38 to extend further into the channel 78.

Even if the hollow projection 76 is not upright, but rather off center, the friction force imparted by the compressed pads 94, 96 is preferably still strong enough to bear any force component of the weight of the sign that would not pass directly through the rod 50. If necessary to prevent toppling, the pads may be further compressed by having more teeth 74, 74' engage each other, i.e., by further closing the clamp. The stem 38 may remain vertical at all times, even during repositioning of the clamp along the rod. In this way, the compressive friction forces need not bear any weight of the said holder.

Another advantage of the clamp is that it may accommodate rods of slightly different diameters. This is particularly useful where the same clamp is used for bars whose diameters may conform to either one of the English or metric systems. For instance, the clamp of the preferred embodiment may grip onto round rods whose outside diameter is any size between one inch and 1 11/32 inches.

FIG. 6 shows the relative position of the upper and lower housing 60, 62 for accommodating a typical large size rod, such as a rod with a 1 5/16 inch outside diameter. The phantom lines show the relative position of the upper and lower housings for accommodating a smaller size rod such as a rod with an outside diameter of 1". In connection with accommodating the larger size rod, edges of the pads 94, 96 which face each other at the side where the engagement of teeth take place define a 60° angular spacing between the pads and the edges at the side where the hinge is located define a 40° angular spacing between the pads. This allows for sufficient clearance between the pads for accommodating the smaller size rod when the upper and lower housings reach the relative position represented by phantom lines.

The teeth 74, 74' need only be on surfaces which face each other. Thus, the lower housing 62 could overlap the upper housing 60 as opposed to the other way around as depicted. In that case, the open handle 84 would be at the free end of the lower housing 62 instead of or the upper housing 60 and the teeth 74, 74' would be on the inner facing surface of the lower housing and the outer facing surface of the upper housing, respectively.

Clamp 40 is extremely convenient to use because it may be readily positioned anywhere along the rod 50 and at some later time be readily removed or displaced manually to a different location along the rod, if necessary, with the use of only one hand. No unscrewing of the any screw-type clamp mechanism, as may be conventionally required, is necessary. There are no screws to be lost.

An accidental brushing against the card holder assembly by a customer or employee who is removing an article of clothing from the rack may cause inadvertent forces to be applied on one side of the card holder. Nevertheless, such forces are resisted by the friction forces imparted by the pads because they are compressed radially against the support rod from a relaxed or uncompressed state to a compressed state in response to the engaging locking forces of the engaged teeth. Consequently, the stem 38 will remain in its vertical position without toppling over. When the teeth are disengaged from each other, the radially compressed friction pad resiliently returns to its relaxed state by expanding radially outward from the compressed state to reach the relaxed state.

While the foregoing description and drawings represent the preferred embodiments of the present invention, it will be understood that various changes and modifications may be made without departing from the spirit and scope of the present invention.

I claim:

1. An arcuate compression clamp useful for holding a sign on a support rod whose periphery is of generally circular cross-section, the clamp comprising:
   (a) an upper housing and a lower housing, said upper and lower housings each having a curved portion between which is defined a space to accommodate the support rod extending therethrough;
   (b) means associated with said upper housing for holding a vertical post of the sign;
   (c) means for hingably connecting each of said upper and lower housings at a corresponding end thereof which permits opposite free ends of said upper and lower housings to move relative to each other in a direction to selectively clamp or release the support rod extending through the space formed between said upper and lower housings;
   (d) releasable engaging means for selectively locking together said free ends of said upper and lower housings at any one of a plurality of relative positions thereof and for releasing the free ends from being locked at any of the plurality of relative positions thereof, said releasable engaging means including engaging elements which engage each other when said free ends of the upper and lower housings overlap each other the upper and lower housings being configured so that in response to a manual movement of the outer one of the overlapping free ends in a radially outward direction relative to the inner one of the free ends, the engaging elements separate from each other to release the upper and lower housings from being locked together;
   (e) at least one of said upper and lower housings comprising friction pad means for contacting the rod when the engaging elements are in engagement with each other in at least one of said relative positions thereof, said friction pad means being compressible from a relaxed state to a compressed state against the rod in response to increasing the amount of the overlap of said free ends of said upper and lower housing, the friction pad means being responsive to the engaging elements separating form each other, for resiliently returning to the relaxed state by expanding in the radially outward direction from the compressed state; and
   (f) handle means extending outwardly from each of said upper and lower housings and being arranged to allow said free ends of said upper and lower housing to be forced manually with one hand into any one of said relative positions and thereby lock together said free ends with said engaging means and to allow said free ends of said upper and lower housing to be forced manually with one hand to separate and thereby release said engaging means from locking said free ends of said upper and lower housing at any one of said relative positions, said handle means including a first handle element extending outwardly from said upper housing and a second handle element extending outwardly from said lower housing, said first and second handle elements being arranged relative to each other to be simultaneously grasped by one hand and then pushed in a circumferential direction toward each other with the one hand for locking together said free ends of said engaging means, said handle means including a third handle element extending outwardly from said upper housing and adapted to be pushed in a radial outward direction with the one hand for releasing said free ends from being locked together, said third handle element being closer to said free end of said upper housing than is said first handle element.

2. A clamp as in claim 1, wherein said engaging means includes teeth which complement each other, the other ends of the upper and lower housings having surfaces which face each other during the overlap, each of the surfaces having a respective plurality of the teeth.

3. A clamp as in claim 2, wherein the teeth each have an inclined edge and an outward edge which extends outward in a radial direction, each of the inclined edges being arranged so as to enable relative displacement of the upper and lower housings in one of a clockwise and counterclockwise directions to allow further overlap of the other ends of the upper and lower housings each of the outward edges being arranged so as to resist relative displacement of the upper and lower housings in the other of the clockwise and counterclockwise directions so as to prevent a decrease in the amount of the overlap.

4. A clamp as in claim 3, wherein the one of the upper and lower housings which overlaps the other may be pulled outward radially from the other to disengage the engaging elements and thereby allow for relative displacement of the upper and lower housings in the other of the clockwise and counterclockwise directions.

5. A clamp as in claim 1, wherein the contact surfaces define a curvilinear surface which corresponds substantially to the shape of the outer surface of a portion of the rod.

6. A clamp as in claim 1, further comprising an adapter inserted within said cavity, the adapter having an opening conforming in shape to a contour of the vertical sign post.

7. A clamp as in claim 1, wherein said upper and lower housings encircle the rod when said engaging means are locked in one of said relative positions.

8. A clamp as in claim 1 wherein said engaging means includes resiliently deformable means urging one of said free ends toward the other for engaging said releasable locking means.

9. A clamp as in claim 1, wherein said means for holding the vertical post of a sign includes a cavity and said pad extends beneath said cavity.

10. An arcuate compression clamp useful for holding a sign on a support rod whose periphery is of generally circular cross-section, the clamp comprising
   (a) an upper housing and a lower housing, said upper and lower housings each having a curved portion between which is defined a space to accommodate the support rod extending therethrough;
   (b) means associated with said upper housing for holding a vertical post of the sign;
   (c) means for hingably connecting each of said upper and lower housings at a corresponding end thereof which permits opposite free ends of said upper and lower housings to move relative to each other in a direction to selectively clamp or release the support rod extending through the space formed between said upper and lower housings;
   (d) releasable engaging means for selectively locking together said free ends of said upper and lower housings at any one of a plurality of relative positions thereof and for releasing the free ends from being locked at any of the plurality of relative positions thereof, said releasable engaging means including engaging elements which engage each other when said free ends of the upper and lower housings overlap each other, the upper and lower housings being configured so that in response to a manual movement of the outer one of the overlapping free ends in a radially outward direction relative to the inner one of the free ends, the engaging elements separate from each other to release the upper and lower housings from being locked together;
   (e) at least one of said upper and lower housings comprising friction pad means for contacting the rod when the engaging elements are in engagement with each other in at least one of said relative positions thereof, said friction pad means being compressible from a relaxed state to a compressed state against the rod in response to increasing the amount of the overlap of said free ends of said upper and lower housings, the friction pad means being responsive to the engaging elements separating from each other, for resiliently returning to the relaxed state by expanding in the radially outward direction from the compressed state; and
   (f) handle means extending outwardly from each of said upper and lower housings and being arranged to allow said free ends of said upper and lower housing to be forced manually with one hand into any one of said relative positions and thereby lock together said free ends with said engaging means and to allow said free ends of said upper and lower housing to be forced manually with one hand to separate and thereby release said engaging means from locking said free ends of said upper and lower housing at any one of said relative positions, said handle means including a first handle element extending outwardly from said upper housing and a second handle element extending outwardly from said lower housing, said first and second handle elements being arranged relative to each other to be simultaneously grasped by one hand and then pushed in a circumferential direction toward each other with the one hand for locking together said free ends of said engaging means said handle means including a third handle element extending outwardly from said upper housing and adapted to be pushed in a radial outward direction with the one hand for releasing said free ends from being locked together.

11. An arcuate compression clamp useful for clamping onto a rod shaped support, the clamp comprising:
   (a) an upper housing and a lower housing, said upper and lower housings each having a curved portion between which is defined a space to accommodate the support extending therethrough;
   (b) means for hingably connecting each of said upper and lower housings at a corresponding end thereof which permits opposite free ends of said upper and lower housing to move relative to each other in a direction to selectively clamp or release the support extending through the space formed between said upper and lower housings;
   (c) releasable engaging means for selectively locking together said free ends of said upper and lower housings at nay one of a plurality of relative positions thereof and for releasing the free ends from being locked at any of the plurality of relative positions thereof, said releasable engaging means including engaging elements which engage each other when said free ends of the upper and lower housings overlap each other, the upper and lower housings being configured so that in response to a manual movement of the outer one of the overlapping free ends in a radially outward direction relative to the inner one of the free ends, the engaging elements separate from each other to release the upper and lower housings from being locked together, said engaging means of said upper housing being arranged relative to said engaging means of said lower housing to keep said free ends locked together until manually released, said upper housing exhibiting a springy force which normally urges said upper free end radially inwardly to normally maintain said engaging elements locked together and said free end of said upper portion being adapted to be flexed outwardly, in opposition to said springy force, to release said engaging elements from being locked together; and
   (d) handle means including a first handle element extending outwardly from said upper housing and a second handle element extending outwardly from said lower housing, said first and second handle elements being arranged relative to each other to be simultaneously grasped by one hand and then pushed in a circumferential direction toward each other with the one hand for locking together said free ends of said engaging means, said handle means including a third handle element extending outwardly from said upper housing and adapted to be pushed in a radial outward direction with the one hand for releasing said free ends from being locked together, said third handle element being closer to said free end of said upper housing than is said first handle element.

* * * * *